DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 10, 1973

912 O.G. 400

T912,002

POLYETHYLENE-WAX EMULSIONS

William F. Baxter, Jr., Rte. 10, Windmere Place, Kingsport, Tenn. 37664, and Craig M. Davis, 2710 Schumway Drive, Johnson City, Tenn. 37601

Filed May 1, 1972, Ser. No. 248,918

Int. Cl. C08h *9/08*

U.S. Cl. 106—271

No Drawing. 10 Pages Specification

Method for producing low viscosity, high solids content emulsions comprising adding from about 0.01% to about 3% by weight, based on the total weight of the emulsion of sodium salt of polymerized sulfonic or carboxylic acid, preferably the sodium salt of sulfonated naphthalene formaldehyde condensate, to an emulsion of oxidized polyethylene, paraffin wax or a blend thereof in water. Suitable emulsifying agents or fatty acids and an alkaline reagent are also used in the emulsion. This emulsion may be used as components of various polishes and coatings.